US012722783B2

(12) United States Patent
Morales Anton et al.

(10) Patent No.: US 12,722,783 B2
(45) Date of Patent: Sep. 1, 2026

(54) IN-FLIGHT ENTERTAINMENT SYSTEM KIT AND INSTALLATION METHOD THEREOF, PASSENGER SEAT AND AIRCRAFT

(71) Applicants: AIRBUS (CHINA) ENTERPRISE MANAGEMENT AND SERVICES COMPANY LIMITED, Beijing (CN); AIRBUS OPERATIONS GmbH, Hamburg (DE)

(72) Inventors: Alejandro Morales Anton, Beijing (CN); Changming Chen, Beijing (CN); Udo Brunswig, Hamburg (DE); Tobias Schmidt-Schaeffer, Hamburg (DE)

(73) Assignees: AIRBUS (CHINA) ENTERPRISE MANAGEMENT AND SERVICES COMPANY LIMITED, Beijing (CN); AIRBUS OPERATIONS GmbH, Hamburg (DE)

( * ) Notice: Subject to any disclaimer, the term of this patent is extended or adjusted under 35 U.S.C. 154(b) by 223 days.

(21) Appl. No.: 18/694,845

(22) PCT Filed: Sep. 16, 2022

(86) PCT No.: PCT/CN2022/119216
§ 371 (c)(1),
(2) Date: Mar. 22, 2024

(87) PCT Pub. No.: WO2023/045833
PCT Pub. Date: Mar. 30, 2023

(65) Prior Publication Data

US 2024/0300648 A1 Sep. 12, 2024

(30) Foreign Application Priority Data

Sep. 23, 2021 (CN) ......................... 202111113785.X
Sep. 23, 2021 (CN) ......................... 202122309374.X

(51) Int. Cl.
*B64D 11/00* (2006.01)
*B64F 5/10* (2017.01)

(52) U.S. Cl.
CPC .......... *B64D 11/00151* (2014.12); *B64F 5/10* (2017.01)

(58) Field of Classification Search
CPC ...... B64D 11/00151; B64F 5/10; B60N 2/879
See application file for complete search history.

(56) References Cited

U.S. PATENT DOCUMENTS 7,040,697 B1 * 5/2006 Tuccinardi ............. B60N 2/879
297/217.3
10,035,443 B1 * 7/2018 Sayed .................... B60N 2/879
(Continued)

FOREIGN PATENT DOCUMENTS

CN 207291879 U 5/2018
CN 207895797 U 9/2018
(Continued)

OTHER PUBLICATIONS

Extended European Search Report for Application No. 22871879.7, eight pages, dated Dec. 10, 2024.
(Continued)

*Primary Examiner* — Eret C McNichols
(74) *Attorney, Agent, or Firm* — Nixon & Vanderhye, PC

(57) ABSTRACT

An in-flight entertainment system kit and an installation method thereof are disclosed for a passenger seat and an aircraft. The in-flight entertainment system kit includes a display assembly, and the display assembly includes a flexible support board and a flexible display screen installed on a passenger side surface of the flexible support board. The passenger seat includes the in-flight entertainment system kit. The aircraft includes the in-flight entertainment system kit or the passenger seat. The in-flight entertainment system (Continued)

kit and the installation method thereof, the passenger seat and the aircraft can improve the in-flight safety, and provide a compact design, which can provide the necessary auxiliary functions without occupying the available space of the passenger, and can further realize the quick assembly and disassembly of the in-flight entertainment system kit.

18 Claims, 10 Drawing Sheets

(56) References Cited

U.S. PATENT DOCUMENTS

| | | | | |
|---|---|---|---|---|
| 10,556,549 | B2 * | 2/2020 | Chang | B60N 2/58 |
| 10,793,038 | B2 * | 10/2020 | Chang | B60R 11/0235 |
| 11,220,198 | B2 * | 1/2022 | Cotterell | B64D 11/00152 |
| 11,609,473 | B2 * | 3/2023 | Bao | G02F 1/1341 |
| 11,630,635 | B2 * | 4/2023 | Cho | H04R 9/06 381/152 |
| 11,702,206 | B2 * | 7/2023 | Soo | B64D 11/00151 345/204 |
| 11,772,797 | B2 * | 10/2023 | Maurmaier | G09F 9/335 297/163 |
| 12,031,664 | B2 * | 7/2024 | Wang | G09F 9/301 |
| 12,085,995 | B2 * | 9/2024 | Magi | G06F 1/1616 |
| 2006/0113827 | A1 * | 6/2006 | Stoschek | C09K 11/06 297/188.01 |
| 2012/0268665 | A1 * | 10/2012 | Yetukuri | B60K 35/22 348/837 |
| 2015/0253813 | A1 | 9/2015 | Morrow | |
| 2016/0154435 | A1 * | 6/2016 | Yanagisawa | H04N 13/383 348/47 |
| 2016/0297526 | A1 | 10/2016 | Everhart et al. | |
| 2017/0105301 | A1 * | 4/2017 | Sun | H04N 5/64 |
| 2020/0062632 | A1 | 2/2020 | Brennan et al. | |
| 2022/0227492 | A1 | 7/2022 | Puertolas et al. | |
| 2023/0122385 | A1 * | 4/2023 | Wang | F16M 11/08 248/176.3 |
| 2023/0209751 | A1 * | 6/2023 | Cho | G09F 9/301 361/807 |
| 2025/0115357 | A1 * | 4/2025 | Masson | G09F 21/049 |

FOREIGN PATENT DOCUMENTS

| | | | |
|---|---|---|---|
| CN | 110154926 | A | 8/2019 |
| CN | 209852205 | U | 12/2019 |
| CN | 212220106 | U | 12/2020 |
| CN | 212556805 | U | 2/2021 |
| CN | 213139046 | U | 5/2021 |
| CN | 216916302 | U | 7/2022 |
| EP | 3339173 | A1 | 6/2018 |
| EP | 3 575 201 | A1 | 12/2019 |
| WO | 2008/014352 | A1 | 1/2008 |
| WO | 2020/249592 | A1 | 12/2020 |
| WO | 2021/165699 | A1 | 8/2021 |

OTHER PUBLICATIONS

International Search Report for PCT/CN2022/119216, mailed Nov. 25, 2022, 4 pages.

Written Opinion of the ISA for PCT/CN2022/119216, mailed Nov. 25, 2022, 5 pages.

* cited by examiner

IN-FLIGHT ENTERTAINMENT SYSTEM KIT AND INSTALLATION METHOD THEREOF, PASSENGER SEAT AND AIRCRAFT

CROSS REFERENCE TO RELATED APPLICATIONS

This application is a National Phase of International Application Number PCT/CN2022/119216 filed Sep. 16, 2022, which designated U.S. and claims the benefit of priorities to the following Chinese patent applications: Chinese patent application No. 202111113785.X, titled "AN IN-FLIGHT ENTERTAINMENT SYSTEM KIT AND AN INSTALLATION METHOD THEREOF, A PASSENGER SEAT AND AN AIRCRAFT", filed with the China National Intellectual Property Administration on Sep. 23, 2021; and Chinese patent application No. 202122309374.X, titled "AN IN-FLIGHT ENTERTAINMENT SYSTEM KIT, A PASSENGER SEAT AND AN AIRCRAFT", filed with the China National Intellectual Property Administration on Sep. 23, 2021, which are incorporated herein by reference in their entireties.

FIELD

The present disclosure relates to the field of aircraft. More specifically, the present disclosure relates to an in-flight entertainment system kit and an installation method thereof, a passenger seat having the in-flight entertainment system kit, and an aircraft having the in-flight entertainment system kit or the passenger seat.

BACKGROUND

The contents of this section only provide background information related to this disclosure, which may not constitute the prior art.

During the travel experience of passengers by aircraft, in order to improve the passengers' travel experience, various auxiliary functional accessories are generally provided on the passenger seat to provide auxiliary services for passengers. For example, a newspaper bag is generally provided on the backrest of the passenger seat for receiving a ride safety card or various newspapers, for passengers to read. A foldable tray board is also provided on the backrest of the passenger seat, for passengers to place items when needed. Besides, an in-flight entertainment system with a display may also be provided on the backrest of the passenger seat for passengers to watch films and programs. However, during flight, the space of the aircraft is limited, and therefore, the available space for each passenger in the passenger compartment is limited. Therefore, it is generally desirable that the above various auxiliary functional accessories do not take up too much space. In addition, ride safety has always been a concern.

Therefore, it is desirable to optimize the design of the passenger seat, so that various auxiliary functional accessories can be provided while not affecting the available space for the passenger, and the ride safety can be improved.

SUMMARY

One object underlying the present disclosure is to improve the design of an in-flight entertainment system and improve its use safety. Another object underlying the present disclosure is to improve the design of the passenger seat, so that the required accessories can be provided while the available space of the passenger is not additionally occupied, so as to provide a compact design and improve the ride experience. Yet another object underlying the present disclosure is to improve the design of the aircraft to improve the travel experience of passengers.

One aspect of the present disclosure is to provide an in-flight entertainment system kit. The in-flight entertainment system kit includes a display assembly, and the display assembly includes a flexible support board and a flexible display screen installed on a passenger side surface of the flexible support plate.

By providing the above display assembly, the display assembly can have flexibility while supporting the display and electronic parts thereof. On one hand, the use safety of the in-flight entertainment system kit can be improved. On the other hand, when installing the in-flight entertainment system kit to a target installation position, there is no need to provide a separate support board.

The flexible support board is formed with a central body portion and an edge portion surrounding the central body portion. The flexible display screen and the electronic parts for the flexible display screen are installed in the central body portion.

Since the display screen and the electronic parts for the display screen are installed in the central body portion, it is allowable to trim the edge portion of the display screen according to the required size, without damaging the display screen and the electronic parts thereof, so that the in-flight entertainment system kit provided with the display assembly can meet the installation requirements of different sizes, and the scope of application of the in-flight entertainment system kit is expanded.

In one embodiment, the flexible support board includes a flexible first support plate and a flexible second support plate overlapping to each other, the flexible display screen is installed on a passenger side surface of the first support plate, and the electronic parts are installed between the first and second support plates.

With the flexible support board including the first and second support plates, the electronic parts for the flexible display screen can be installed and packaged in a space between the first and second support plates.

In an embodiment, a notch portion is provided at the edge portion of the flexible support board. The notch portion extends from an upper edge of the edge portion toward the central body portion so that a receiving space with an upward opening is formed between a target installation position and the display assembly when the in-flight entertainment system kit is installed to the target installation position.

By providing the notch portion, when the in-flight entertainment system kit is installed to the target installation position, the in-flight entertainment system kit can further be used as a newspaper bag in addition to the functions of an in-flight entertainment system, making the design more compact.

In an embodiment, the in-flight entertainment system kit further includes a flexible adaptation layer. The display assembly is installed to a target installation position via the flexible adaptation layer, and the flexible adaptation layer is installed to the edge portion of the flexible support board and is on a side opposite to the flexible display screen.

By providing the flexible adaptation layer, the in-flight entertainment system kit can adapt to the target installation positions with different contours, such as different curved surfaces, which expands the scope of application of the in-flight entertainment system kit. In addition, the flexible adaptation layer can absorb impact, thereby further improving the use safety.

In an embodiment, the in-flight entertainment system kit further includes elastic bands. The elastic bands are installed to the edge portion of the flexible support board and on a side opposite to the flexible display screen.

By providing the elastic bands, it is allowable to move the display assembly within a certain range when the display assembly of the in-flight entertainment system kit is pulled, so as to enlarge the receiving space formed between the target installation position and the display assembly and to prevent damage to the display assembly.

In an embodiment, the in-flight entertainment system kit further includes a transparent cover. The transparent cover is installed to the display assembly to cover at least a portion of a passenger side surface of the display assembly. By providing the transparent cover, it can facilitate cleaning of the in-flight entertainment system kit, and can provide better protection for the display assembly.

Preferably, the transparent cover has substantially the same contour as the contour of the display assembly, so that the overall in-flight entertainment system kit has a compact structure. Preferably, the transparent cover is integrally formed into a single piece, thereby avoiding the aggregation of foreign matter.

The flexible support board is made of one of the following materials or a combination thereof: plant fiber, porous material, thermoplastic molding material, and silicone rubber.

In an embodiment, the display assembly further includes a fabric layer, which covers, around the flexible display screen, the passenger side surface of the flexible support plate.

By providing the fabric layer, a well appearance and touch sense can be provided.

In an embodiment, a seal is installed around an edge of the flexible display screen, which can provide better sealing for the display assembly.

Another aspect of the present disclosure is to provide a passenger seat. A rear surface of a backrest of the passenger seat is installed with the in-flight entertainment system kit according to the present disclosure.

By installing the in-flight entertainment system kit on the passenger seat, the in-flight entertainment system kit can further be used as a newspaper bag while realizing the functions of the in-flight entertainment system, making the design of the passenger seat more compact.

In an embodiment, the rear surface of the backrest is provided with multiple installation seats spaced apart from each other, the in-flight entertainment system kit is provided with multiple installation pins spaced apart from each other, and the multiple installation pins are installed to the multiple installation seats respectively.

In an embodiment, the rear surface of the backrest is provided with two first installation pipes, and the two first installation pipes extend along the longitudinal direction of the backrest and are spaced apart from each other in a width direction of the backrest. The in-flight entertainment system kit is provided with two second installation pipes spaced apart from each other, and the two second installation pipes are installed to the two first installation pipes, respectively.

By the above pin-seat installation method or pipe-in-pipe installation method or any other suitable installation method, the in-flight entertainment system kit can be quickly assembled or disassembled.

Another aspect of the present disclosure is to provide an aircraft comprising a passenger seat according to the present disclosure.

Another aspect of the present disclosure is to provide an aircraft, in which an in-flight entertainment system kit according to the present disclosure is installed.

In an embodiment, the in-flight entertainment system kit is installed to a rear surface of a backrest of a passenger seat of the aircraft.

Another aspect of the present disclosure is to provide a method for installing an in-flight entertainment system kit, which includes: providing an in-flight entertainment system kit according to the present disclosure; trimming a portion of an edge portion of the in-flight entertainment system kit according to a contour of a target installation position of the in-flight entertainment system kit; and installing the trimmed in-flight entertainment system kit to the target installation location.

In an embodiment, the target installation position is s rear surface of a backrest of a passenger seat of an aircraft.

Features and other advantages of the present disclosure will become apparent from the following non-limiting detailed description.

BRIEF DESCRIPTION OF THE DRAWINGS

The embodiments of the present disclosure will be described below with reference to the drawings only by way of example. In the drawings, same features or components are indicated by same reference signs, and the drawings may not be drawn to scale. In the drawings.

DETAILED DESCRIPTION OF THE EMBODIMENTS

The following description is essentially only illustrative, rather than intending to limit the present disclosure and the application or usage thereof. It should be appreciated that, throughout all drawings, similar reference signs indicate the same or similar parts or features. Each drawing only illustratively shows the concept and principle of the embodiments of the present disclosure, and does not necessarily show the specific dimensions and scales of various embodiments of the present disclosure. Specific parts in specific drawings may be exaggerated to illustrate related details or structures of various embodiments of the present disclosure.

In the description of the embodiments of the present disclosure, the orientation terms related to "upper", "lower", "left", and "right" used herein are described according to the upper, lower, left and right position relationships of the views shown in the accompanying drawings. In practical applications, the positional relationships of "upper", "lower", "left", and "right" used herein may be defined according to actual conditions. These relationships may be reversed. In addition, unless otherwise explicitly expressed in the present application, the conjunction word "or" includes the meaning of "and/or".

Figure 1:
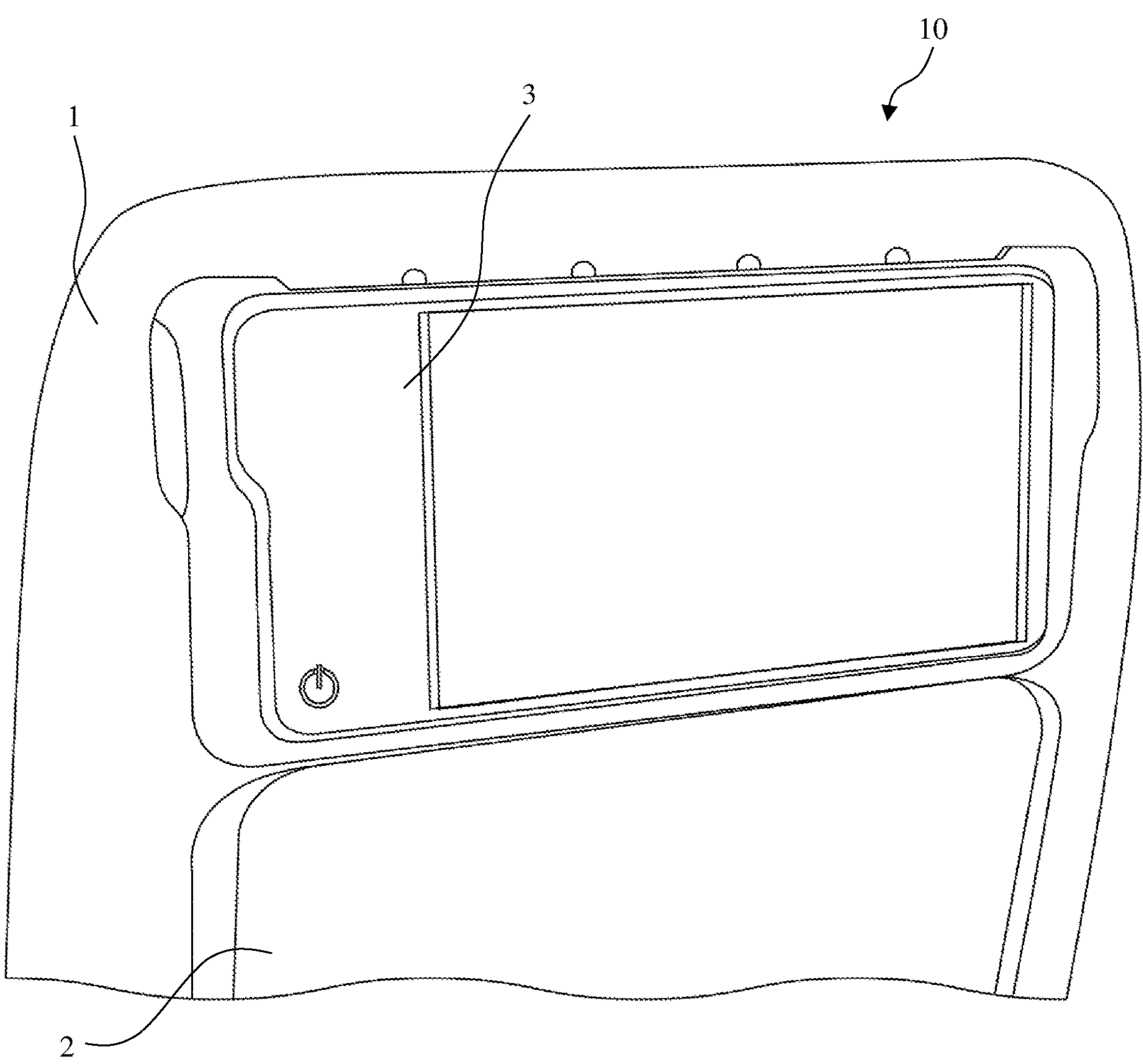
FIG. 1 shows a perspective view of part of a passenger seat installed with an in-flight entertainment system kit according to a first embodiment of the present disclosure.

FIG. 1 is a perspective view of part of a passenger seat 10 according to the first embodiment of the present disclosure, showing the backrest of the passenger seat 10. As shown in FIG. 1, the rear surface of the backrest 1 of the passenger seat 10 is installed with a foldable tray board 2. The foldable tray board 2 is such installed that it is located at a height above the passenger's knees when unfolded, which is convenient for the passenger to use and avoids the occupation of the space for passengers' legs. The height of the foldable tray board 2 may be designed, for example, according to the knee height of a common adult in the fiftieth percentile. Further, the rear surface of the backrest 1 is further installed with an in-flight entertainment system kit 3 above the foldable tray board 2. The in-flight entertainment system kit 3 provides various entertainments for passengers, and can further be used as a newspaper bag for storing a ride safety card or various newspapers or magazines for passengers to read.

Figure 2:
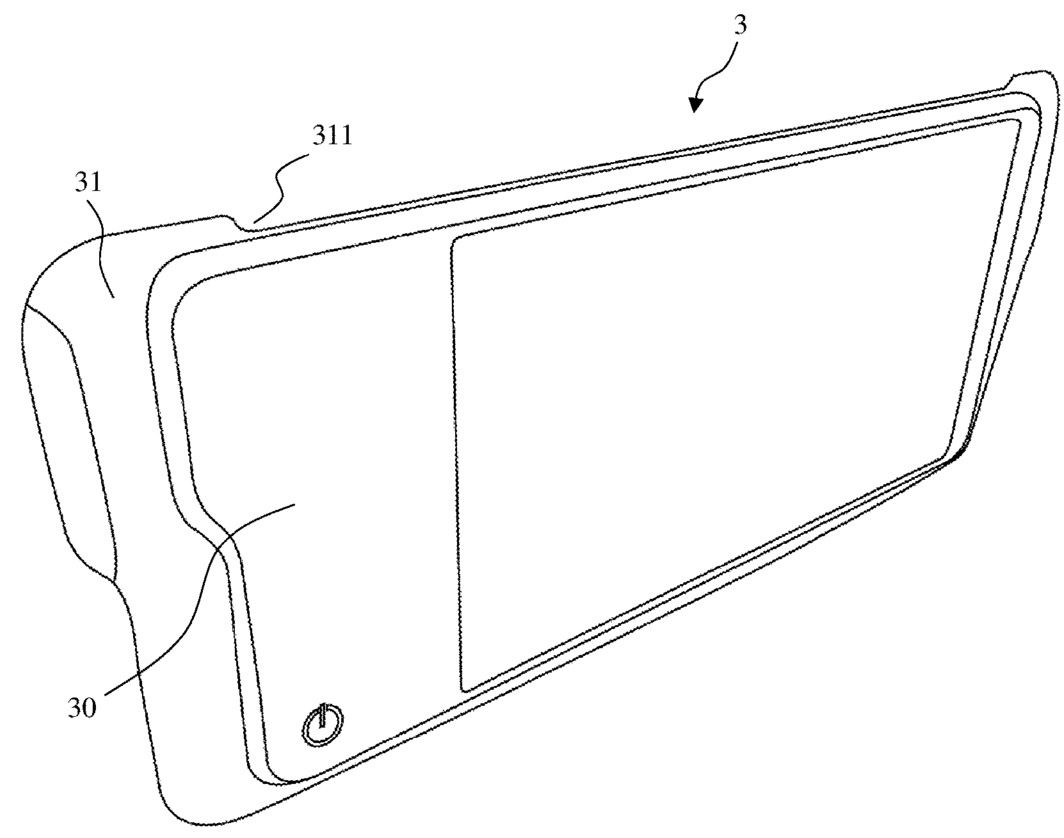
FIG. 2 shows a perspective view of the in-flight entertainment system kit installed on the passenger seat shown in FIG. 1.
Figure 3:
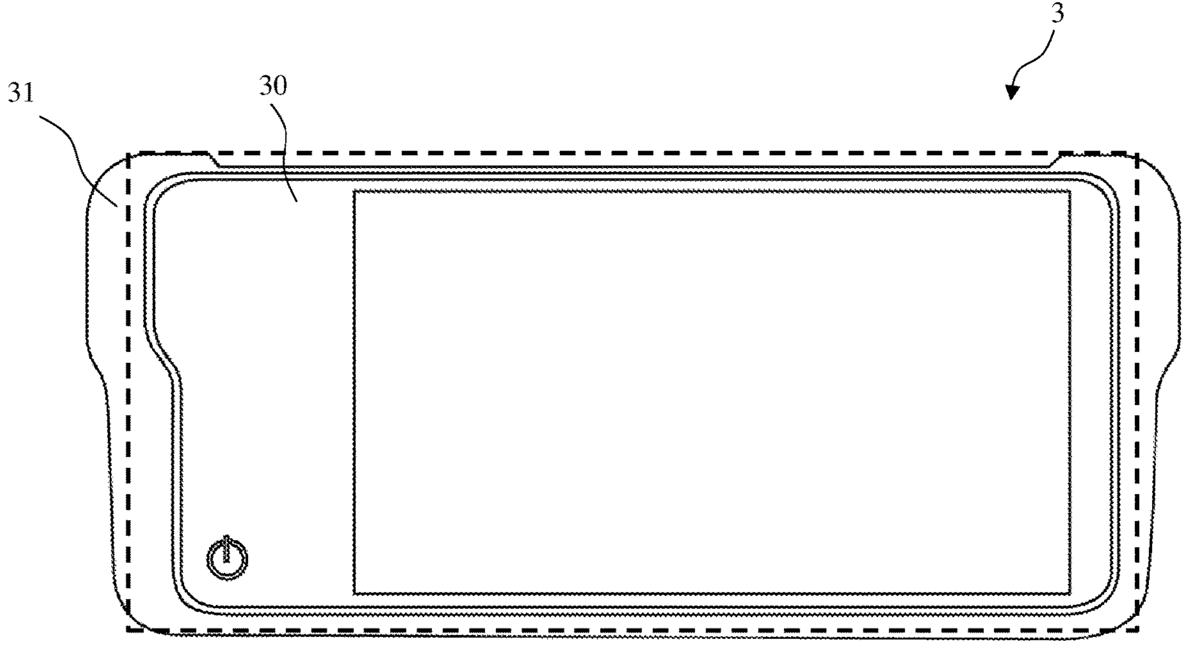
FIG. 3 shows a front view of the in-flight entertainment system kit shown in FIG. 2.

FIGS. 2 to 3 show an embodiment of the in-flight entertainment system kit 3. FIG. 2 shows a perspective view of the in-flight entertainment system kit 3, and FIG. 3 shows a front view of the in-flight entertainment system kit 3. As shown in FIGS. 2 to 3, the in-flight entertainment system kit 3 includes a protruding central body portion 30 and an edge portion 31 surrounding the central body portion 30. In the embodiment shown in FIGS. 2 to 3, the central body portion 30 protrudes towards a passenger side with respect to the edge portion 31. However, the present disclosure is not limited thereto. In an embodiment of the in-flight entertainment system kit 3 according to the present disclosure, the central body portion 30 may recess with respect to the edge portion 31, i.e., protruding towards a backrest side. In another embodiment of the in-flight entertainment system kit 3 according to the present disclosure, the central body portion 30 even may flush with the edge portion 31. The edge portion 31 is provided with a notch portion 311. The notch portion 311 extends from an upper edge of the edge portion 31 toward the central body portion 30. When the in-flight entertainment system kit 3 is installed to the rear surface of the backrest 1, the edge portion 31 is attached to the rear surface of the backrest 1, and a receiving space with an upward opening is formed between the in-flight entertainment system kit 3 and the rear surface of the backrest 1. The notch portion 311 may form an inlet of the receiving space. This receiving space can be used as the newspaper bag. Newspapers, magazines, and the like can be placed in the receiving space.

Figure 4:
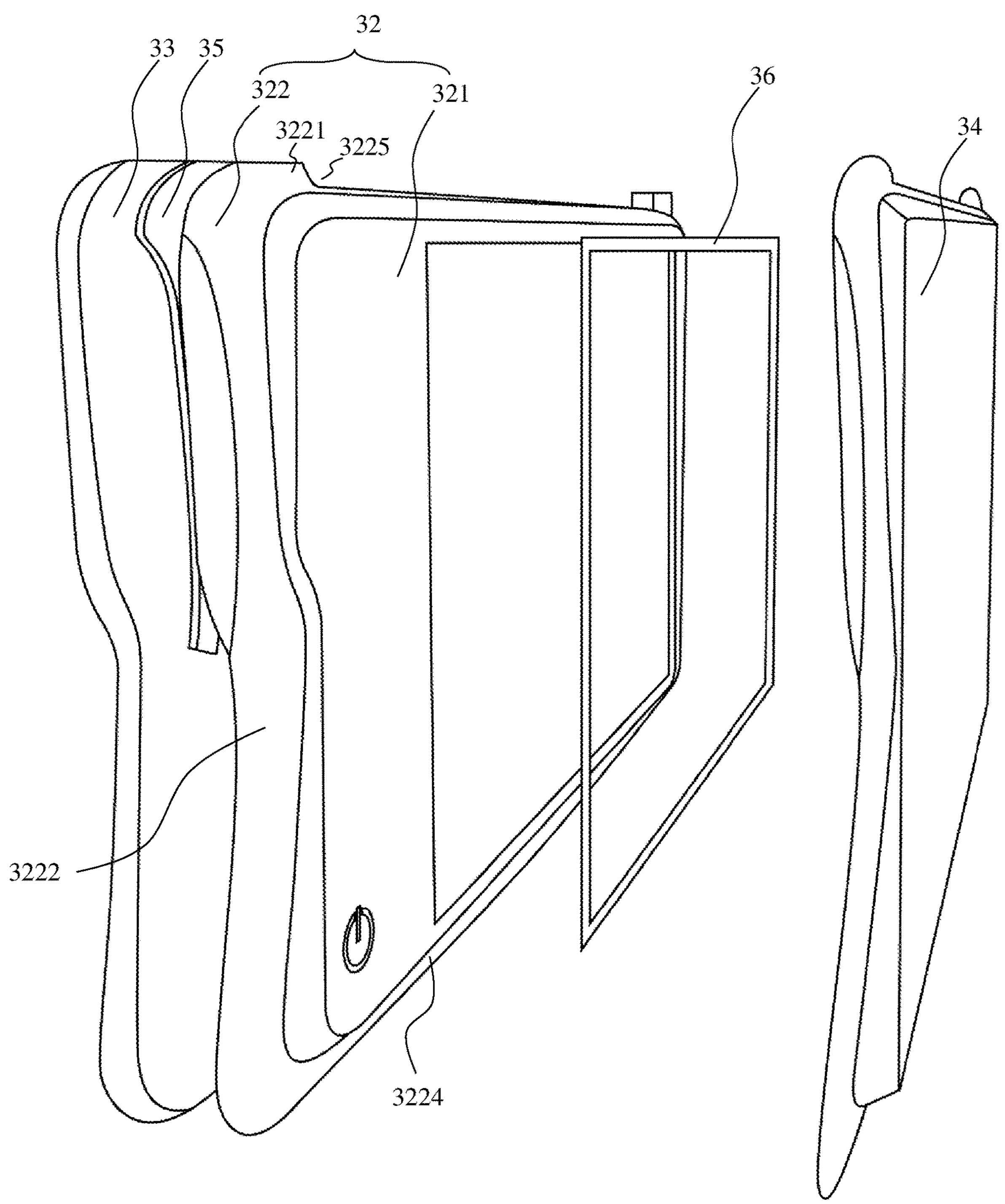
FIG. 4 shows an exploded perspective view of an in-flight entertainment system according to an embodiment of the present disclosure.
Figure 5:
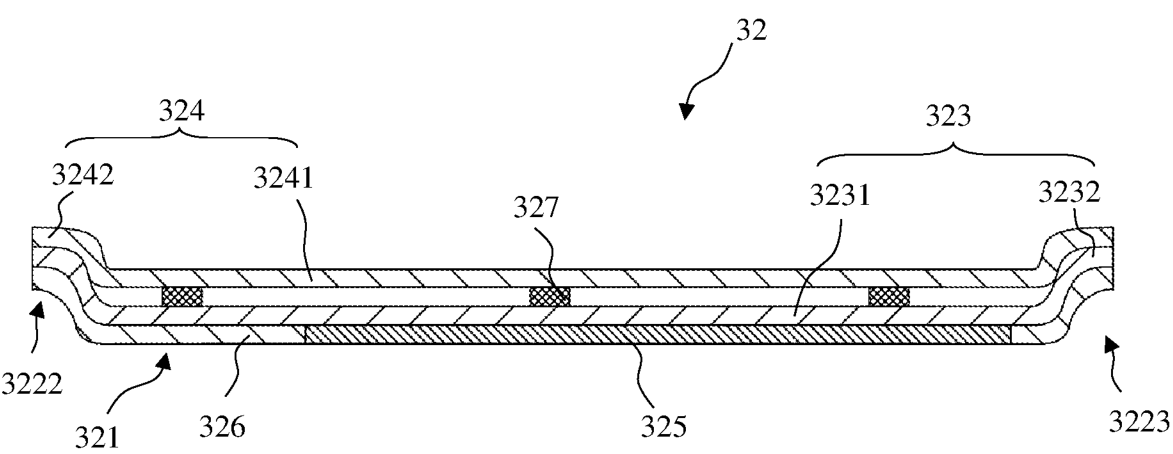
FIG. 5 shows a cross-sectional view of a display assembly of the in-flight entertainment system kit shown in FIG. 4.
Figure 6:
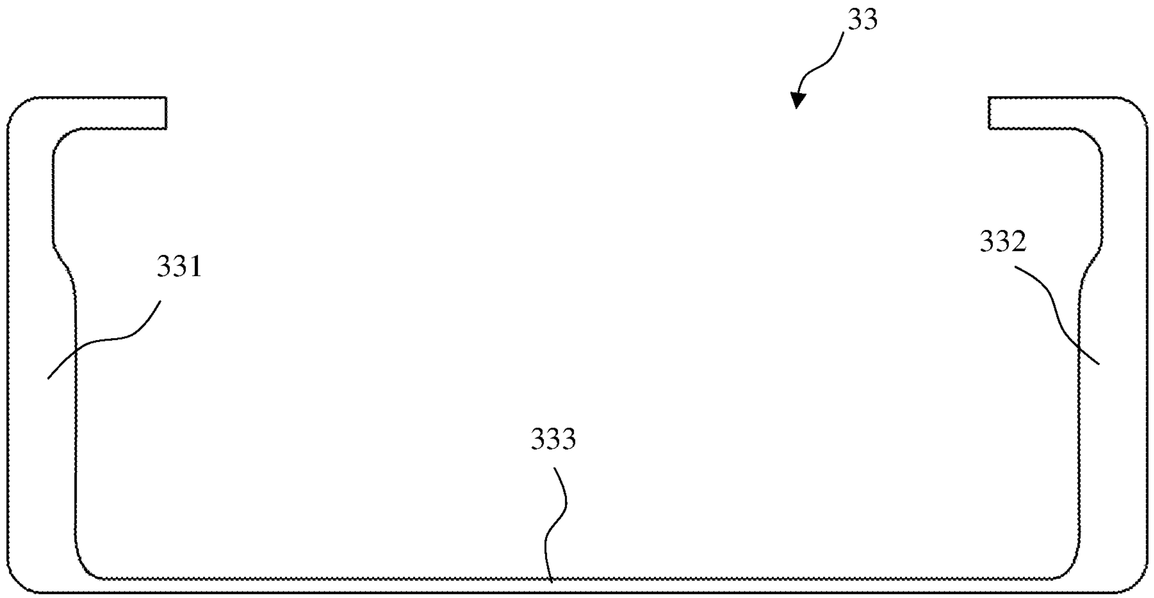
FIG. 6 shows a plan view of a flexible adaptation layer of the in-flight entertainment system kit shown in FIG. 4.

FIGS. 4 to 6 show an in-flight entertainment system kit 3 according to an embodiment of the present disclosure. FIG. 4 shows an exploded perspective view of the in-flight entertainment system kit 3. As best shown in FIG. 4, the in-flight entertainment system kit 3 is formed into a multi-layer structure, which includes a display assembly 32, a flexible adaptation layer 33, a transparent cover 34, elastic bands 35, and a seal 36.

The display assembly 32 is the main functional part of the in-flight entertainment system kit 3. The display assembly 32 is a flexible display assembly and includes a central body portion 321 and an edge portion 322 surrounding the central body portion 321. FIG. 5 shows a cross-sectional view of a display assembly 32 in a lateral direction thereof (a direction parallel to a left-right direction of the backrest 1). As shown in FIGS. 4 to 5, the central body portion 321 of the display assembly 32 protrudes towards a passenger side with respect to the edge portion 322. The edge portion 322 of the display assembly 32 includes a left edge portion 3222, a right edge portion 3223, and an upper edge portion 3221 and a lower edge portion 3224 located between the left edge portion 3222 and the right edge portion 3223. The upper edge portion 3221 is formed with a notch portion 3225, and the notch portion 3225 extends from an upper edge of the upper edge portion 3221 toward the central body portion 321.

The display assembly 32 includes a flexible support board, and a display screen 325 and electronic parts 327 thereof installed on the flexible support board. Both the display screen 325 and electronic parts 327 thereof are installed on a central body portion of the flexible support board. In the embodiment shown in FIG. 5, the flexible support board of the display assembly 32 includes a flexible first support plate 323 on a passenger side and a flexible second support plate 324. The passenger side surface of the flexible support board is a passenger side surface of the first support plate 323.

As shown in FIG. 5, the outer contour of the first support plate 323 is substantially the same as the outer contour of the display assembly 32, and the first support plate 323 is integrally formed with a protruding central body portion 3231 and an edge portion 3232 surrounding the central body portion 3231. The display screen 325 is installed on a passenger side surface (a surface facing a passenger side) of the central body portion 3231 of the first support plate 323, while the electronic parts 327 for the display screen 325 are installed between the first support plate 323 and the second support plate 324, on a side opposite to the passenger side surface of the central body portion 3231 of the first support plate 323 (a side facing the backrest 1). For example, the electronic parts 327 can be installed on a backrest side surface (a surface facing the backrest 1) of the first support plate 323. However, the present disclosure is not limited thereto. In other possible embodiment, the electronic parts 327 can be embedded in the first support plate 323.

In the embodiment as shown, the outer contour of the second support plate 324 is substantially the same as the outer contour of the first support plate 323, and the second support plate 324 includes a protruding central body portion 3241 and an edge portion 3242 surrounding the central body portion 3241. The second support plate 324 is installed to the backrest side surface of the first support plate 323. The edge portion 3242 of the second support plate 324 is installed to the edge portion 3232 of the first support plate 323, and the central body portion 3241 of the second support plate 324 and the central body portion 3231 of the first support plate 323 are spaced from each other so that the plurality of electronic parts 327 including a switch are installed and packaged in a space between the central body portion 3231 of the first support plate 323 and the central body portion 3241 of the second support plate 324. However, the present disclosure is not limited thereto. In other embodiments, the outer contour of the second support plate 324 can be different from the outer contour of the first support plate 323, as long as that the electronic parts 327 can be packaged therebetween. For example, the second support plate 324 can cover only the central body portion 3231 of the first support plate 323 so as to package the electronic parts 327.

Thus, both the display screen 325 and electronic parts 327 thereof are installed on the central body portion 321 of the display assembly 32, while the edge portion 322 of the display assembly 32 does not have the display screen 325 or electronic parts 327 thereof thereon.

The display screen 325 is a flexible display screen, for example, a flexible OLED (organic light emitting diode) display screen. Preferably, the display screen 325 is a flexible touch-sensitive OLED display screen. Compared to conventional glass display screens, the display screen 325 is flexible, which has the advantages of slim, flexible and lightweight. When subjected to an impact during use, for example, when a passenger accidentally hits the display screen 325 during takeoff or landing, the display screen 325 is not easy to break, and will not produce glass shards, which thereby greatly reduces safety hazards and improves in-flight safety.

In the embodiment shown in FIG. 5, the display assembly 32 further includes a fabric layer 326 covering on the first support plate 323. The fabric layer 326 covers, around the display screen 325, the passenger side surface of the first support plate 323 and wraps the periphery of the display screen 325 so as to provide a well appearance and touch sense. However, the fabric layer 326 is not necessary. In other embodiment of the present disclosure, the display assembly 32 may be not provided with the fabric layer 326.

The first support plate 323 and the second support plate 324 are flexible, but have sufficient rigidity to maintain their shapes when installing the display screen 325 and the electronic parts 327 thereof thereon. Thanks to the flexible support plates, when the display screen 325 is subjected to an impact or collision, for example, a collision with the passenger's head, the flexible first support plate 323 and the flexible second support plate 324 can be deformed to absorb the impact, thereby preventing passengers from being injured. Therefore, the in-flight safety can be further improved. The first support plate 323 and the second support plate 324 can be made of any suitable material that meets the above rigidity and flexibility requirements and complies with the airworthiness specification, for example, the material complying with the Young-Modul requirement and/or impact deformation requirement, including but not limited to plant fiber (such as coconut fiber), porous material (such as foamed plastics), thermoplastic molding material (such as, ABS, PEEK), silicone rubber (such as silicone rubber wrapped transparent plastic parts, silicone rubber wrapped composite parts), other suitable material or the combination thereof. The first support plate 323 and the second support plate 324 can be made of same or different materials. In an embodiment, both the first support plate 323 and the second support plate 324 are an elastic plastic plate made of a thermoplastic molding material (such as ABS).

In one embodiment, the display assembly 32 is installed to the rear surface of the backrest 1 of the passenger seat via a flexible adaptation layer 33, so that the display assembly 32 can be installed to the rear surface of the backrests with different contours. The flexible adaptation layer 33 is installed to a backrest side of the edge portion 322 of the display assembly 32. The flexible adaptation layer 33 is located on a side opposite to the display screen 325, and is installed to the backrest side surface of the second support plate 324. The flexible adaptation layer 33 is installed as close as possible to the central body portion 321 of the display assembly 32, and can extend inwards over an inner edge of the edge portion 322, even overlapping with part of the central body portion 321. FIG. 6 shows a plan view of the flexible adaptation layer 33 according to an embodiment. As shown in FIG. 6, the flexible adaptation layer 33 is substantially U-shaped, and includes a first portion 331 and a second portion 332 which are spaced apart from each other, and further includes a third portion 333 connected between the first portion 331 and the second portion 332. The flexible adaptation layer 33 is installed to the edge portion 322 of the display assembly 32 to surround three side edges of the central body portion 321 of the display assembly 32, i.e., the left edge, the lower edge, and the right edge. The first portion 331 of the flexible adaptation layer 33 is installed to the left edge portion 3222 of the edge portion 322 of the display assembly 32, and is partially installed to the upper edge portion 3221 of the edge portion 322 of the display assembly 32. The second portion 332 of the flexible adaptation layer 33 is installed to the right edge portion 3223 of the edge portion 322 of the display assembly 32, and is partially installed to the upper edge portion 3221 of the edge portion 322 of the display assembly 32. The third portion 333 of the flexible adaptation layer 33 is installed to the lower edge portion 3224 of the edge portion 322 of the display assembly 32. The flexible adaptation layer 33 can be made of any suitable material that meets the airworthiness specification. In an embodiment, the flexible adaptation layer 33 is made of foam. By providing the flexible adaptation layer 33, the display assembly 32 according to the present disclosure can be installed to the rear surfaces of the backrests of various passenger seats having different contours (e.g., various rear surfaces having different curvatures), thereby expanding the scope of application of the in-flight entertainment system kit 3 according to the present disclosure. In addition, the flexible adaptation layer 33 can absorb impact, and thus can further improve the in-flight safety.

In an embodiment, a transparent cover 34 may be installed to the passenger side surface of the display assembly 32, so as to facilitate cleaning and to provide protection for the display assembly 32. Preferably, the transparent cover 34 has substantially the same contour as the contour of the display assembly 32, so that the overall in-flight entertainment system kit 3 has a compact structure. The transparent cover 34 covers the entire central body portion 321 of the display assembly 32 and covers at least a portion of the edge portion 322 of the display assembly 32. Preferably, the transparent cover 34 is integrally formed into a single piece, such that when installed to the display assembly 32, a passenger side surface (a surface facing the passenger) of the transparent cover 34 is formed into an integral surface, and there is no joint seam between multiple parts, so that the accumulation of foreign matter (e.g., dust or dirt) can be avoided.

In an embodiment, two elastic bands 35 are installed on the left and right sides of the display assembly 32 respectively, and is on the backrest side of the display assembly 32. For example, in the case that the display assembly 32 is installed to the rear surface of the backrest 1 via the flexible adaptation layer 33, the elastic bands 35 can be installed between the flexible adaptation layer 33 and the edge portion 322 of the display assembly 32. That is, one elastic band 35 is installed between the first portion 331 of the flexible adaptation layer 33 and the left edge portion 3222 of the edge portion 322 of the display assembly 32, and is arranged as close as possible to the central body portion 321 of the display assembly 32; and the other elastic band 35 is installed between the second portion 332 of the flexible adaptation layer 33 and the right edge portion 3223 of the edge portion 322 of the display assembly 32, and is arranged as close as possible to the central body portion 321 of the display assembly 32. In another embodiment, the elastic bands 35 can be installed between the backrest 1 and the display assembly 32. For example, one end of the elastic band 35 is installed to the backrest 1 and the other end of the elastic band 35 is installed to the edge portion 322 of the display assembly 32. In this case, the flexible adaptation layer 33 even can be omitted.

By providing the elastic bands 35, the receiving space formed between the in-flight entertainment system kit 3 and the rear surface of the backrest 1 (more specifically, a receiving space formed between the display assembly 32 and the rear surface of the backrest 1) can be expanded when needed so as to receive more or thicker documents, without causing damage to the in-flight entertainment system kit 3. For example, when the passenger wants to put in a thicker stack of or more newspapers and magazines and pulls the in-flight entertainment system kit 3 installed on the rear surface of the backrest 1, the elastic bands 35 provided on the left and right sides of the display assembly 32 will allow the display assembly 32 to tilt toward the passenger so as to enlarge the receiving space formed between the in-flight entertainment system kit 3 and the rear surface of the backrest 1, without causing damage to the display assembly 32.

Preferably, an annular seal 36 is installed around the edge of the display screen 325. For example, in the embodiment in which the display assembly 32 includes above the fabric layer 326, the annular seal 36 is installed between the fabric layer 326 and an edge of the display screen 325 to enhance the sealing between the fabric layer 326 and the display screen 325, such that even if the transparent cover 34 is not provided, foreign matter (i.e., water or coffee) can be prevented from entering the inside of the display assembly 32 through the joint between the fabric layer 326 and the display screen 325.

Therefore, in the embodiment shown in the drawings, the central body portion 30 of the in-flight entertainment system kit 3 includes the central body portion 321 of the display assembly 32, the seal 36 and a portion of the transparent cover 34, and the edge portion 31 of the in-flight entertainment system kit 3 includes the edge portion 322 of the display assembly 32, the flexible adaptation layer 33, the elastic bands 35 and another portion of the transparent cover 34. As described above, the edge portion 322 of the display assembly 32 is not provided with any electronic part, and the flexible adaptation layer 33 and the elastic bands 35 are both installed at the edge portion 322 of the display assembly 32 close to the central body portion 321 or overlapping with part of the central body portion 321. When trimming the edge portion 31 of the in-flight entertainment system kit 3, even if the edge portion 31 is completely cut off, the display screen 325 and electronic parts 327 thereof located in the central body portion 321 of the display assembly 32 will not be damaged. Therefore, the use of the in-flight entertainment system kit 3 will not be greatly affected. Therefore, the edge portion 31 of the in-flight entertainment system kit 3 can be defined as a trimming area of the in-flight entertainment system kit 3, and the area other than the trimming area of the in-flight entertainment system kit 3 is a non-trimming area of the in-flight entertainment system kit 3. The transparent cover 34 at least covers the entire passenger side surface of the non-trimming area of the in-flight entertainment system kit 3, and can cover at least a portion of the passenger side surface of the trimming area of the in-flight entertainment system kit 3.

In the case that the in-flight entertainment system kit 3 is provided with the flexible adaptation layer 33, preferably, when trimming the edge portion 31 of the in-flight entertainment system kit 3, the flexible adaptation layer 33 is not completely cut off, for example, the width of the flexible adaptation layer 33 in the left-right direction and in the up-down direction is reserved in a predetermined range (for example, 1 mm to 2 cm), or the flexible adaptation layer 33 is not cut off at all, so that the in-flight entertainment system kit 3 can be installed to the target installation position via the flexible adaptation layer 33, so as to adapt to different target installation positions.

For the case where the in-flight entertainment system kit 3 is installed with the elastic bands 35, preferably, the elastic bands 35 are not cut off when trimming the edge portion 31 of the in-flight entertainment system kit 3. To this end, the elastic bands 35 are installed as close as possible to the central body portion 30 of the in-flight entertainment system kit 3, or installed to the central body portion 30.

When installing the in-flight entertainment system kit 3 to the target installation position, for example, to the rear surface of the backrest 1 of the passenger seat, the in-flight entertainment system kit 3 can be trimmed according to the contour of the rear surface to cut off a portion of the edge portion 31 of the in-flight entertainment system kit 3, for example, as shown by the dashed box in FIG. 3. As long as the non-trimming area of the in-flight entertainment system kit 3 is not trimmed, the use of the in-flight entertainment system kit 3 will not be affected. Therefore, by providing the edge portion 31, the in-flight entertainment system kit 3 is adaptive to passenger seats with different sizes.

In addition, interface accessories (not shown) that allow data and/or power transmission between external electronic devices (e.g., mobile electronic devices such as passengers' mobile phones and laptops) and the in-flight entertainment system kit 3 may be provided on a side of the non-trimming area of the in-flight entertainment system kit 3. Preferably, when installing the in-flight entertainment system kit 3 to the rear surface of the backrest 1, above interface accessories fit with corresponding interface accessories on the backrest 1, so as to accomplish the mechanical installation and the electrical installation of the in-flight entertainment system kit 3.

An example of the in-flight entertainment system kit 3 according to the first embodiment of the present disclosure has been described above. In the example of the in-flight entertainment system kit 3 shown in FIGS. 4 to 6, the in-flight entertainment system kit 3 includes the flexible adaptation layer 33, the transparent cover 34, the elastic bands 35, and the seal 36, in addition to the display assembly 32. However, the present disclosure is not limited thereto. As mentioned above, the flexible adaptation layer 33, the transparent cover 34, the elastic bands 35, and the seal 36 are preferably provided, and are not necessary. In other embodiments according to the present disclosure, the in-flight entertainment system kit 3 can dispense with one or more of the flexible adaptation layer 33, the transparent cover 34, the elastic bands 35, and the seal 36, and/or the in-flight entertainment system kit 3 can include other layer. For example, in a modified embodiment where the in-flight entertainment system kit 3 is provided with the flexible adaptation layer 33 and the elastic bands 35, the in-flight entertainment system kit 3 can further include a flexible installation plate (not shown) provided between the flexible adaptation layer 33 and the display assembly 32, one end of the elastic band 35 is installed to the flexible installation plate and the other end of the elastic band 35 is installed to the display assembly 32. In such modified embodiment, when installing the in-flight entertainment system kit 3 to the backrest 1, the flexible adaptation layer 33 and the flexible installation plate can be fixed to the rear surface of the backrest 1, and the elastic bands 35 allow the display assembly 32 to tilt toward the passenger side and return.

Further, in the embodiment shown above, the central body portion 321 of the display assembly 32 protrudes towards a passenger side with respect to the edge portion 322. However, the present disclosure is not limited thereto. In another modified embodiment according to the present disclosure, the central body portion 321 of the display assembly 32 may recess with respect to the edge portion 322, i.e., protruding towards a backrest side. In another modified embodiment according to the present disclosure, the central body portion 321 of the display assembly 32 even may flush with the edge portion 322. In such modified embodiment where the central body portion 321 of the display assembly 32 flushes with the edge portion 322, a label (such as wireframe with bright color) can be provided on the passenger side surface of the display assembly 32 to show the boundary between the central body portion 321 and the edge portion 322, so as to facilitate recognizing of the trimming area when trimming the in-flight entertainment system kit 3.

Figure 7:
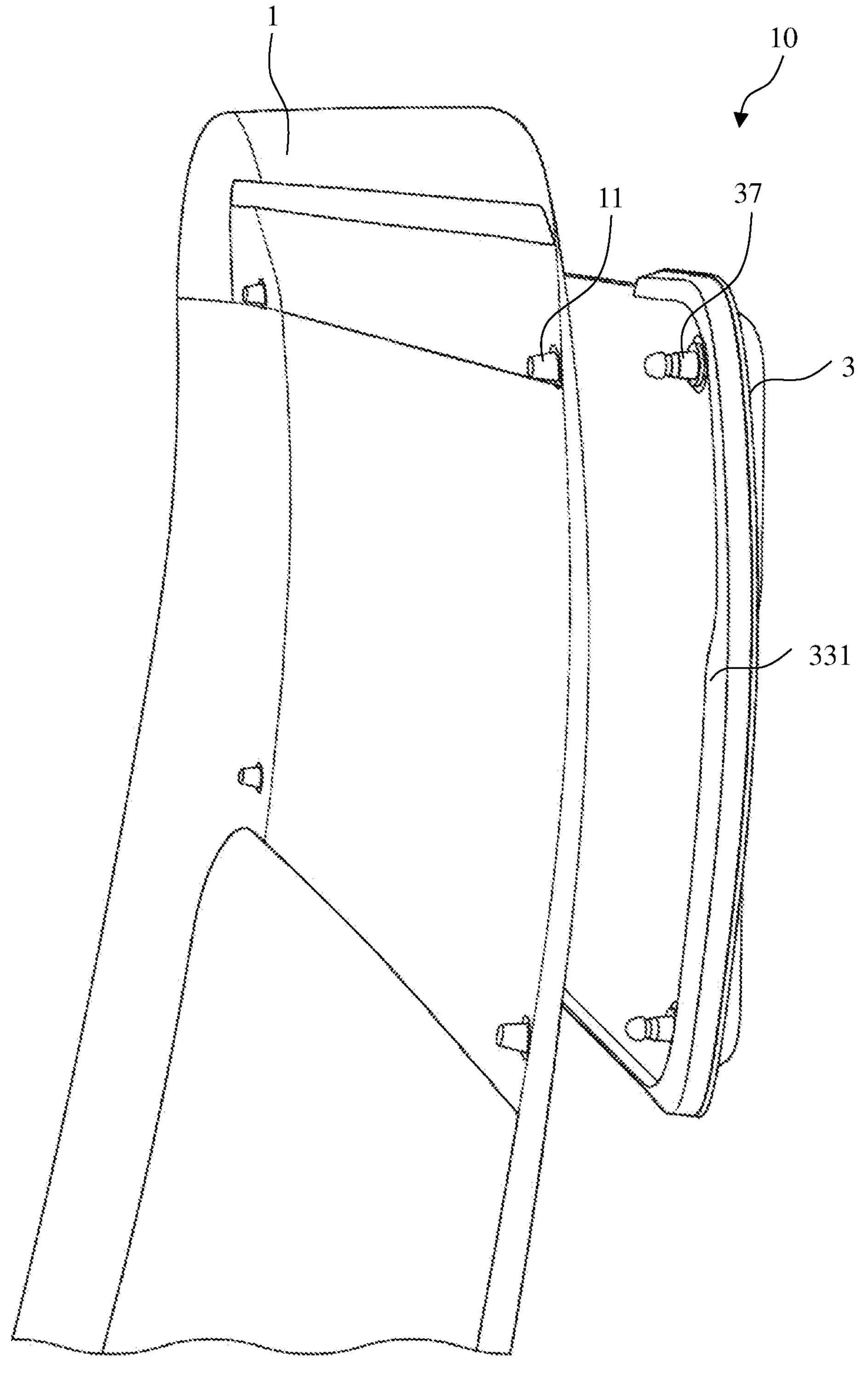
FIG. 7 shows a partial exploded perspective view of the passenger seat shown in FIG. 1.

FIG. 7 shows a partial exploded perspective view of the passenger seat 10 shown in FIG. 1, showing an example of the installation between the backrest 1 of the passenger seat 10 and the in-flight entertainment system kit 3. As shown in FIG. 7, the rear surface of the backrest 1 is provided with multiple installation seats 11 spaced apart from each other, and a corresponding number of installation pins 37 are provided on the backrest side surface of the in-flight entertainment system kit 3 facing the backrest 1. In the example shown in FIG. 7, the rear surface of the backrest 1 is provided with four installation seats 11, and four installation pins 37 are provided on the in-flight entertainment system kit 3 (two installation pins 37 are shown in FIG. 7). When installing the in-flight entertainment system kit 3 to the backrest 1, only the installation pins 37 of the in-flight entertainment system kit 3 need to be aligned with the corresponding installation seats 11 on the backrest 1, and the in-flight entertainment system kit 3 is pushed toward the backrest 1 to buckle the installation pins 37 to the corresponding installation seats 11, so that the in-flight entertainment system kit 3 is installed to the backrest 1. And when disassembling, the installation pins 37 of the in-flight entertainment system kit 3 are pulled out from the installation seats 11. Therefore, the assembly and disassembly of the in-flight entertainment system kit 3 are very convenient and fast. Preferably, anti-removal screws (not shown in the drawings) are installed at the edge portion 31 of the in-flight entertainment system kit 3, to prevent the in-flight entertainment system kit 3 from being removed by non-maintenance personnel.

The in-flight entertainment system kit 3, and the passenger seat 10 installed with the in-flight entertainment system kit 3 according to the first embodiment of the present disclosure have been described above. The use of the flexible display assembly 32 in the in-flight entertainment system kit 3 according to the first embodiment of the present disclosure can improve the in-flight safety. Preferably, the in-flight entertainment system kit 3 is further provided with the flexible adaptation layer 33, so that on the one hand, the in-flight entertainment system kit 3 can adapt to the backrests of different contours, expanding the scope of application of the in-flight entertainment system kit 3, and on the other hand, the flexible adaptation layer 33 can absorb impacts, further improving the in-flight safety. Preferably, the in-flight entertainment system kit 3 is further provided with the elastic bands 35, so that the receiving space formed between the in-flight entertainment system kit 3 and the rear surface of the backrest 1 can be enlarged when needed, without causing damage to the in-flight entertainment system kit 3. When the in-flight entertainment system kit 3 is installed to the rear surface of the backrest 1 of the passenger seat 10, the in-flight entertainment system kit 3 can further be used as a newspaper bag in addition to the functions of an in-flight entertainment system, making the design of the passenger seat 10 more compact.

Preferably, after the in-flight entertainment system kit 3 is installed to the rear surface of the backrest 1, an inclination angle of the in-flight entertainment system kit 3 is adjustable to meet the needs of passengers.

Figure 8:
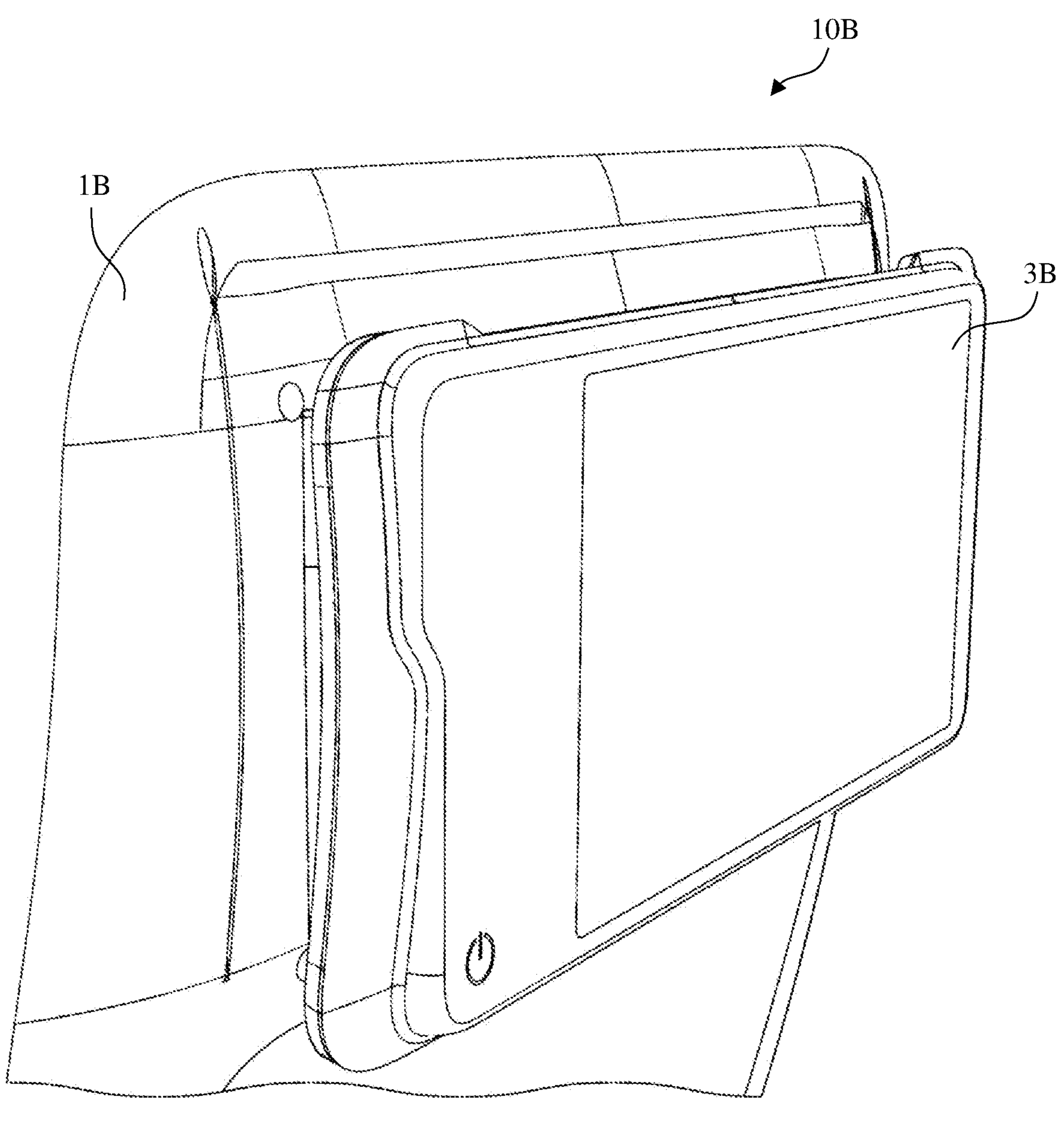
FIG. 8 shows a partial exploded perspective view of the passenger seat installed with the in-flight entertainment system kit according to a second embodiment of the present disclosure.

FIG. 8 shows a partial exploded perspective view of a passenger seat 10B installed with the in-flight entertainment system kit according to a second embodiment of the present disclosure. The passenger seat 10B has substantially the same configuration as the passenger seat 10 according to the first embodiment of the present disclosure, and the rear surface of the backrest 1B of the passenger seat 10B is installed with an in-flight entertainment system kit 3B. The only difference lies in the installation method between the in-flight entertainment system kit 3B and the rear surface of the backrest 1B. Hereinafter, only the difference between the passenger seat 10B and the passenger seat 10 will be described, and the same parts of the passenger seat 10B and the passenger seat 10 will be denoted by the same reference signs and will not be described repeatedly.

Figure 9:
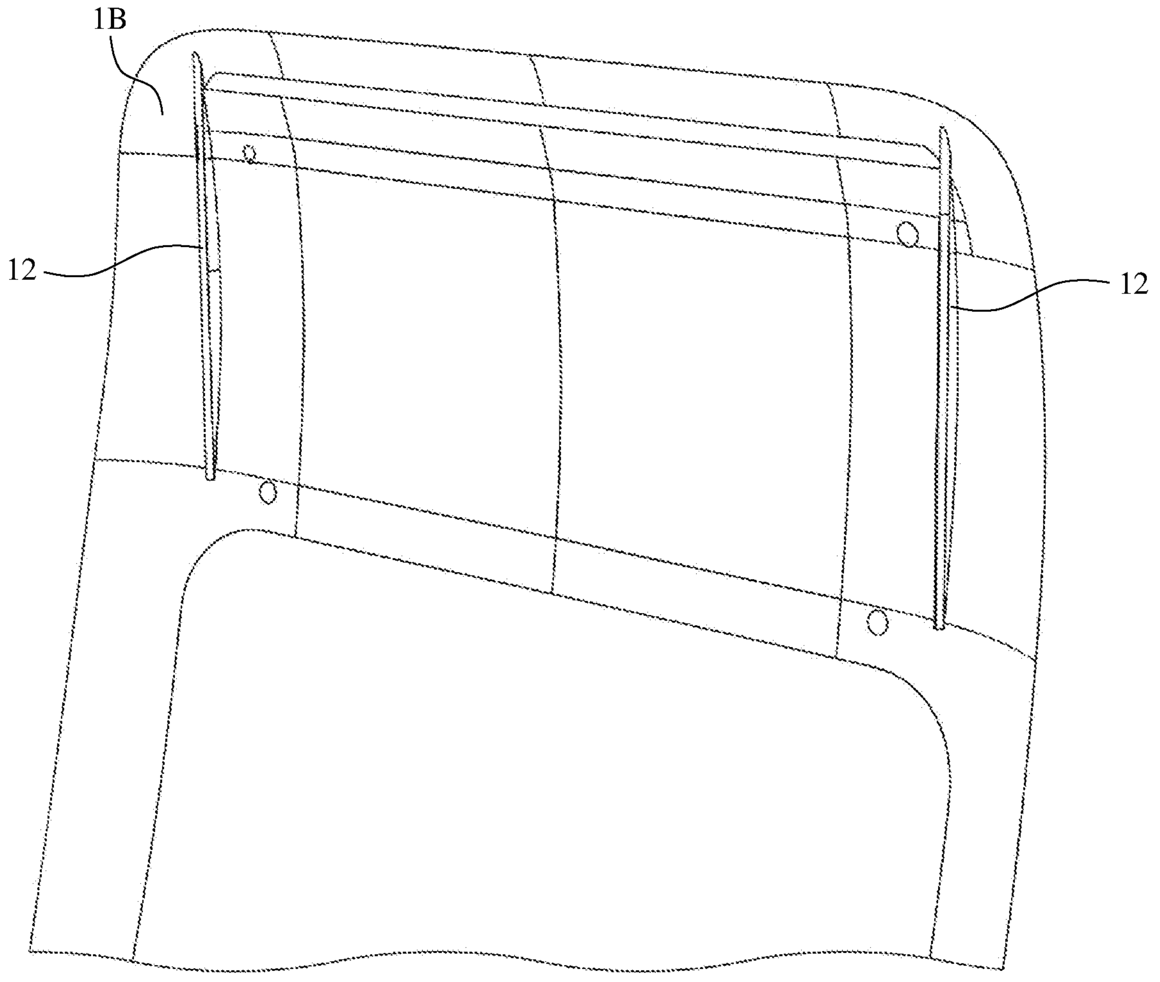
FIG. 9 shows a perspective view of part of the backrest of the passenger seat shown in FIG. 8 with the in-flight entertainment system kit being removed.
Figure 10:
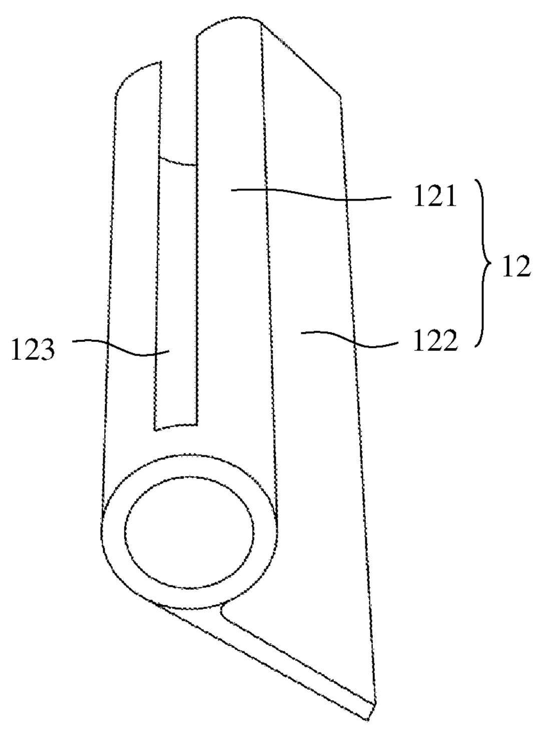
FIG. 10 shows a perspective view of an installation member used by the backrest of the passenger seat shown in FIG. 9.
Figure 11:
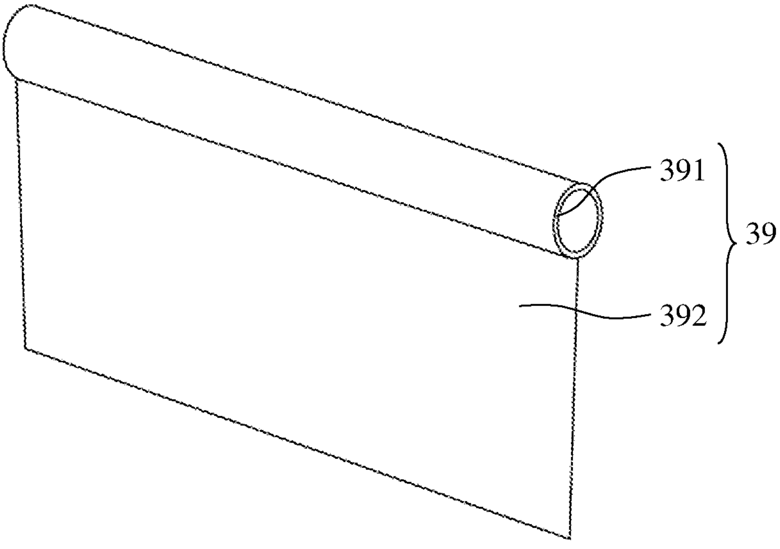
FIG. 11 shows a perspective view of an installation member used by the in-flight entertainment system kit shown in FIG. 8.

As shown in FIG. 8, a pipe-in-pipe installation method is used between the in-flight entertainment system kit 3B and the backrest 1B. FIG. 9 shows a perspective view of part of the backrest 1B, showing the rear surface of the backrest 1B. As shown in FIG. 9, two first installation pipes 12 are installed on the rear surface of the backrest 1B. The two first installation pipes 12 extend along the longitudinal direction of the backrest 1B (the up-down direction in FIG. 9), and are spaced apart from each other along the width direction of the backrest 1B (the left-right direction in FIG. 9). The spacing between the two first installation pipes 12 generally corresponds to the spacing between two second installation pipes on the in-flight entertainment system kit 3B. FIG. 10 shows a perspective view of the first installation pipe 12. As shown in FIG. 10, the first installation pipe 12 includes a cylindrical portion 121 and an installation sheet portion 122. The installation sheet portion 122 is arranged to be installed to the backrest 1B. The cylindrical portion 121 is provided with a slit 123 that extends longitudinally. FIG. 11 shows an example of the second installation pipe. As shown in FIG. 11, the second installation pipe 39 includes a cylindrical portion 391 and a fabric sheet 392. One end of the fabric sheet 392 wraps the cylindrical portion 391, and the other end of the fabric sheet 392 is fixed to the in-flight entertainment system kit 3B. When the in-flight entertainment system kit 3B is installed to the backrest 1B, the cylindrical portions 391 of the two second installation pipes 39 on the in-flight entertainment system kit 3B are respectively inserted into the corresponding first installation pipes 12, and the fabric sheets 392 of the second installation pipes 39 are inserted into the slits 123 of the first installation pipes 12.

Preferably, after the in-flight entertainment system kit 3B is installed to the rear surface of the backrest 1B, an inclination angle of the in-flight entertainment system kit 3B is adjustable to meet the needs of passengers.

The in-flight entertainment system kit 3B and the passenger seat 10B according to the second embodiment of the present disclosure can achieve beneficial technical effects similar to the first embodiment described above.

Figure 12:
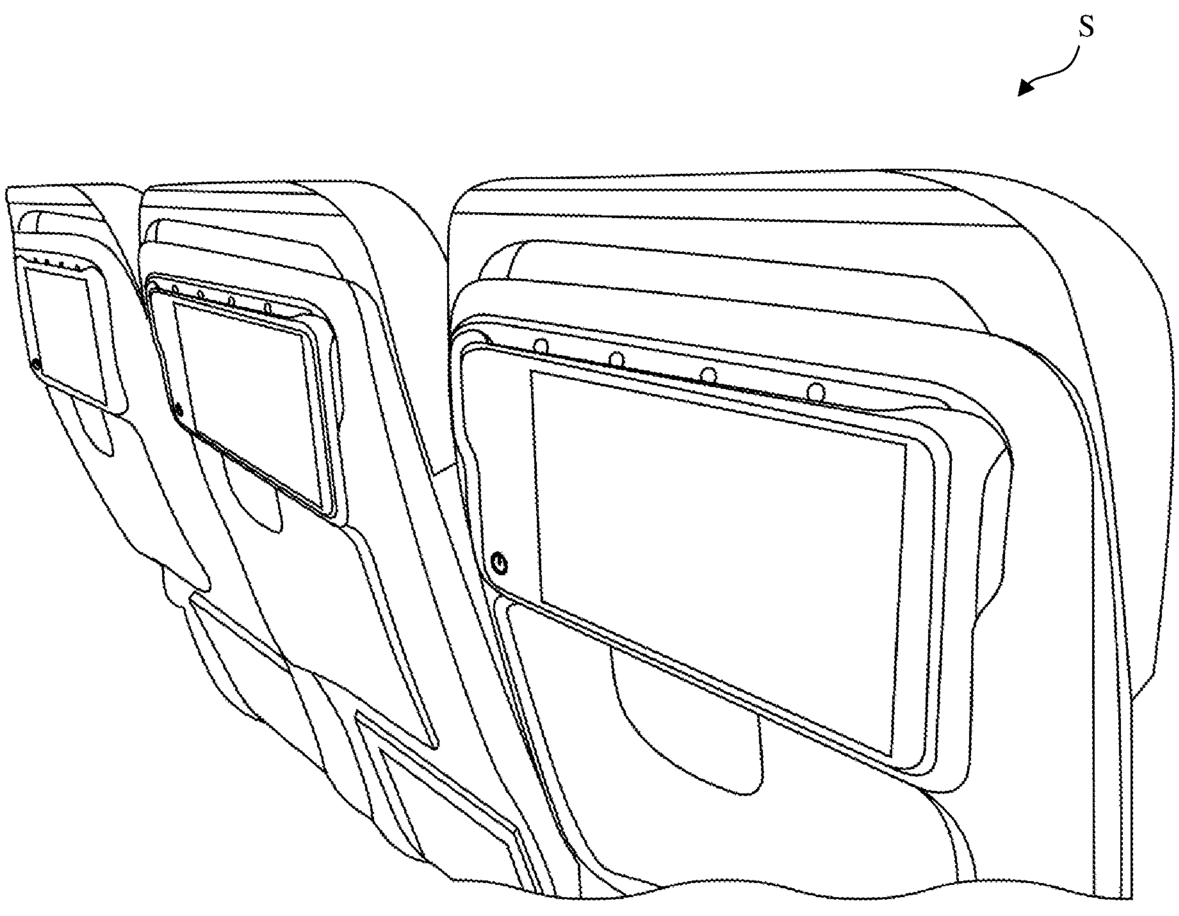
FIG. 12 shows a perspective view of part of a plurality of passenger seats according to the present disclosure.
Figure 13:
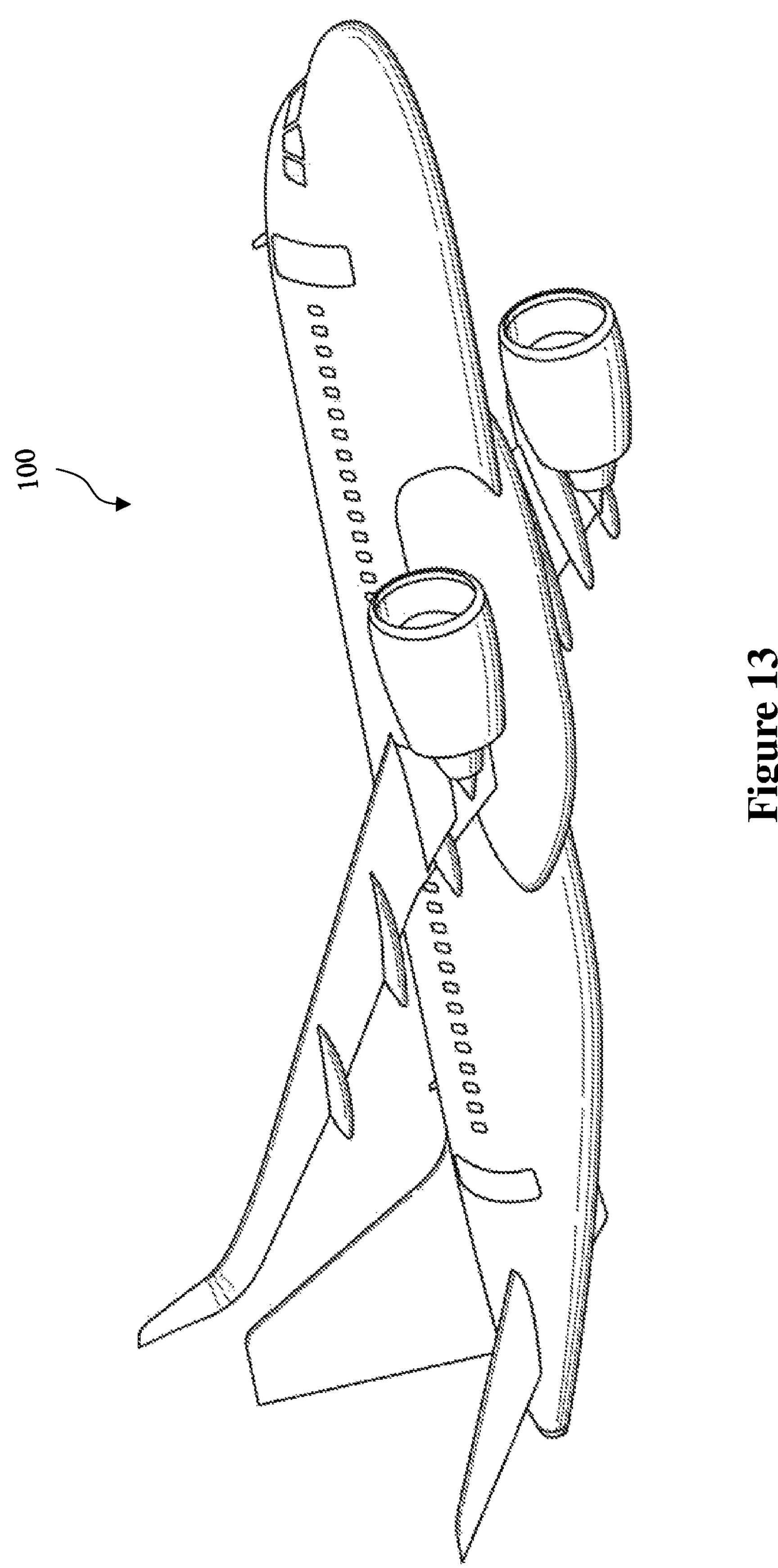
FIG. 13 is a perspective view of an aircraft according to the present disclosure.

FIG. 12 shows multiple passenger seats S. The multiple passenger seats S may include the passenger seat 10 according to the first embodiment of the present disclosure, and/or the passenger seat 10B according to the second embodiment of the present disclosure. FIG. 13 shows a perspective view of an aircraft 100 according to an embodiment of the present disclosure. The aircraft 100 may be installed with multiple passenger seats S. Alternatively, the aircraft 100 may be installed with the in-flight entertainment system kit according to the present disclosure. For example, the in-flight entertainment system kit is installed to the rear surface of the backrest of the existing passenger seat in the aircraft 100.

Exemplary embodiments of the in-flight entertainment system kit, the passenger seat, and the aircraft according to the present disclosure have been described above in conjunction with the application of the in-flight entertainment system kit in the passenger seat. However, the present disclosure is not limited thereto, and in other examples according to the present disclosure, the in-flight entertainment system kit can be installed to other positions. It should be understood that the present disclosure is not limited to the specific embodiments described and shown in detail above. Without departing from the spirit and scope of the present disclosure, those skilled in the art can make various modifications and variations to the present disclosure. All the variations and modifications are within the scope of the present disclosure. Moreover, all the components described herein can be replaced by other technically equivalent components.

The invention claimed is:

1. An in-flight entertainment system kit comprising a display assembly, wherein the display assembly comprises:

a flexible support board;

a flexible display screen installed on a passenger side surface of the flexible support board;

wherein the flexible support board is formed with a central body portion and an edge portion surrounding the central body portion;

the flexible display screen and electronic parts for the flexible display screen are installed in the central body portion; and, wherein a notch portion is provided at the edge portion of the flexible support board, the notch portion extends from an upper edge of the edge portion toward the central body portion so that a receiving space with an upward opening is formed between a target installation position and the display assembly when the in-flight entertainment system kit is installed to the target installation position.

2. The in-flight entertainment system kit according to claim 1, wherein the flexible support board comprises a flexible first support plate and a flexible second support plate overlapping to each other, the flexible display screen is installed on a passenger side surface of the first support plate, and the electronic parts are installed between the first and second support plates.

3. The in-flight entertainment system kit according to claim 2, wherein the in-flight entertainment system kit further comprises a transparent cover, and the transparent cover is installed to the display assembly to cover at least a portion of a passenger side surface of the display assembly.

4. The in-flight entertainment system kit according to claim 1, wherein the in-flight entertainment system kit further comprises a flexible adaptation layer, the display assembly is installed to a target installation position via the flexible adaptation layer, and the flexible adaptation layer is installed to the edge portion of the flexible support board and is on a side opposite to the flexible display screen.

5. The in-flight entertainment system kit according to claim 1, wherein the in-flight entertainment system kit further comprises elastic bands, and the elastic bands are installed to the edge portion of the flexible support board and on a side opposite to the flexible display screen.

6. The in-flight entertainment system kit according to claim 1, wherein the in-flight entertainment system kit further comprises a transparent cover, and the transparent cover is installed to the display assembly to cover at least a portion of a passenger side surface of the display assembly.

7. The in-flight entertainment system kit according to claim 1, wherein the flexible support board is made of one of the following materials or a combination thereof: plant fiber, porous material, thermoplastic molding material, and silicone rubber.

8. The in-flight entertainment system kit according to claim 1, wherein the display assembly further comprises a fabric layer, which covers, around the flexible display screen, the passenger side surface of the flexible support plate.

9. The in-flight entertainment system kit according to claim 1, wherein a seal is installed around an edge of the flexible display screen.

10. A passenger seat, wherein a rear surface of a backrest of the passenger seat is installed with an in-flight entertainment system kit according to claim 1.

11. The passenger seat according to claim 10, wherein the rear surface of the backrest is provided with a plurality of installation seats spaced apart from each other; and the in-flight entertainment system kit is provided with a plurality of installation pins spaced apart from each other, and the plurality of installation pins are installed to the plurality of installation seats respectively.

12. The passenger seat according to claim 10, wherein the rear surface of the backrest is provided with two first installation pipes, and the two first installation pipes extend along a longitudinal direction of the backrest and are spaced apart from each other in a width direction of the backrest; and the in-flight entertainment system kit is provided with two second installation pipes spaced apart from each other, and the two second installation pipes are installed to the two first installation pipes, respectively.

13. The in-flight entertainment system kit according to claim 1, wherein the in-flight entertainment system kit further comprises a transparent cover, and the transparent cover is installed to the display assembly to cover at least a portion of a passenger side surface of the display assembly.

14. The in-flight entertainment system kit according to claim 1, wherein the display assembly further comprises a fabric layer, which covers, around the flexible display screen, the passenger side surface of the flexible support plate.

15. An aircraft, further comprising the passenger seat according to claim 10.

16. An aircraft, wherein the in-flight entertainment system kit according to claim 1 is installed in the aircraft.

17. A method for installing an in-flight entertainment system kit, comprising:

providing an in-flight entertainment system kit according to claim 1;

trimming a portion of an edge portion of the in-flight entertainment system kit according to a contour of a target installation position of the in-flight entertainment system kit; and installing the trimmed in-flight entertainment system kit to the target installation location.

18. The method for installing the in-flight entertainment system kit according to claim 17, wherein the target installation position is a rear surface of a backrest of a passenger seat of an aircraft.

* * * * *